(12) United States Patent
Sugiura et al.

(10) Patent No.: US 9,738,236 B2
(45) Date of Patent: Aug. 22, 2017

(54) DECORATIVE COMPONENT AND DECORATIVE COMPONENT UNIT

(71) Applicant: TOYODA GOSEI CO., LTD., Kiyosu-shi, Aichi-ken (JP)

(72) Inventors: Tatsuya Sugiura, Kiyosu (JP); Tatsuya Oba, Kiyosu (JP); Akihiro Misawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 64 days.

(21) Appl. No.: 14/847,124

(22) Filed: Sep. 8, 2015

(65) Prior Publication Data

US 2016/0107585 A1    Apr. 21, 2016

(30) Foreign Application Priority Data

Oct. 17, 2014  (JP) ................................. 2014-212540
Feb. 5, 2015   (JP) ................................. 2015-020900

(51) Int. Cl.
| | |
|---|---|
| *B60R 11/04* | (2006.01) |
| *B60R 13/00* | (2006.01) |
| *B60R 13/04* | (2006.01) |

(52) U.S. Cl.
CPC ............ *B60R 11/04* (2013.01); *B60R 13/005* (2013.01); *B60R 13/04* (2013.01)

(58) Field of Classification Search
CPC ........ B60R 11/04; B60R 13/005; B60R 13/04
USPC .......................... 296/1.08; 293/116; 348/148
See application file for complete search history.

(56) References Cited

U.S. PATENT DOCUMENTS

| | | | |
|---|---|---|---|
| 2016/0202443 A1* | 7/2016 | Knutsson | ................ B60R 11/04 348/148 |
| 2016/0261034 A1* | 9/2016 | Geise | ................ B29C 45/14434 |
| 2016/0297437 A1* | 10/2016 | Hara | ........................ B60R 11/04 |
| 2016/0377251 A1* | 12/2016 | Kim | ..................... F21S 48/1726 362/466 |
| 2017/0001578 A1* | 1/2017 | Buschmann | ............ B60R 11/04 |

FOREIGN PATENT DOCUMENTS

JP    2006-193070 A    7/2006

* cited by examiner

*Primary Examiner* — Jason S Morrow
(74) *Attorney, Agent, or Firm* — Posz Law Group, PLC

(57) ABSTRACT

A rear emblem forms an outer surface and includes a base member made of transparent plastic and a pattern print layer arranged on a part of the back side of the base member. The pattern print layer includes a light transmitting portion and a light transmission reducing portion. The light transmission reducing portion is arranged around the light transmitting portion and transmits less light than the light transmitting portion.

9 Claims, 4 Drawing Sheets

DECORATIVE COMPONENT AND DECORATIVE COMPONENT UNIT

BACKGROUND OF THE INVENTION

The present invention relates to a decorative component that is mounted to a vehicle and has an outer surface exposed to the outside of the vehicle. The present invention also relates to a decorative component unit that transmits light from the vehicle outside toward an in-vehicle camera, which is arranged against the outer surface of the decorative component in the vehicle.

An in-vehicle camera is mounted to, for example, a vehicle rear part to help a driver check the surrounding of the vehicle. An image taken by the in-vehicle camera is displayed on a monitor arranged in the vehicle. This allows the driver who sees the monitor to check the area behind the vehicle.

The in-vehicle camera for checking the area behind the vehicle is preferably arranged at a predetermined height in the center of the rear part of the vehicle to obtain a necessary range of vision. For example, Japanese Laid-Open Patent Publication No. 2006-193070 discloses an in-vehicle camera arranged on a garnish, which is a decorative component mounted on the back door.

In the document, the in-vehicle camera is mounted to the interior of the vehicle while facing the outer surface of the decorative component. A portion of the decorative component that faces the in-vehicle camera or the entirety of the decorative component is formed by a one-way mirror. This prevents rain drops or dust from collecting on the lens of the in-vehicle camera.

According to the configuration in which a portion of a decorative component that faces an in-vehicle camera is formed by a one-way mirror, the vehicle outside, which is the brighter side, can be seen through from the vehicle inside, which is the darker side. Thus, the image of an area outside the vehicle can be taken by the in-vehicle camera. In contrast, the vehicle inside, which is the darker side, cannot be seen through from the vehicle outside, which is the brighter side. Thus, the portion of the decorative component that faces the in-vehicle camera appears like a mirror when viewed from the vehicle outside. In other words, the portion of the decorative component that faces the in-vehicle camera becomes a design surface with a shiny appearance. In a decorative component having such a one-way mirror, it is difficult to obtain a necessary amount of light with which an image is taken by the in-vehicle camera. Therefore, a decorative component and a decorative component unit, which includes a camera mounting portion used for mounting an in-vehicle camera, are demanded that reduce the visibility of the in-vehicle camera from the vehicle outside and increase the amount of light that comes from the vehicle outside to the in-vehicle camera.

SUMMARY OF THE INVENTION

Accordingly, it is an objective of the present invention to provide a decorative component and a decorative component unit that reduce visibility of an in-vehicle camera from the vehicle outside and increase the amount of light from the vehicle outside to the in-vehicle camera.

To achieve the above objective, a decorative component according to one aspect of the present invention, is adapted to be mounted to a vehicle and have an outer surface, which is exposed to the vehicle outside. An in-vehicle camera is arranged in the vehicle while facing the outer surface. The decorative component transmits light toward the in-vehicle camera from the vehicle outside. The decorative component includes a transparent base member, which forms at least a part of the outer surface, and a decorative layer arranged on a part of a front side or a back side of the base member. The decorative layer includes a light transmitting portion and a light transmission reducing portion that is arranged around the light transmitting portion and transmits less light than the light transmitting portion.

According to a second aspect of the present invention, a decorative component unit is adapted to be mounted to a vehicle. The decorative component unit includes a decorative component and a tubular camera mounting portion. The decorative component is adapted to be mounted to a vehicle and has an outer surface exposed to a vehicle outside. The decorative component is adapted to transmit light from the vehicle outside toward an in-vehicle camera arranged in the vehicle while facing the outer surface. The camera mounting portion is coupled to the decorative component, and the in-vehicle camera is mounted on the camera mounting portion. The decorative component includes a transparent base member, which forms at least a part of the outer surface, and a decorative layer, which is arranged on a part of a front side or a back side of the base member. The decorative layer includes a light transmitting portion and a light transmission reducing portion that is arranged around the light transmitting portion and transmits less light than the light transmitting portion.

DETAILED DESCRIPTION OF THE PREFERRED EMBODIMENTS

First Embodiment

A decorative component and a decorative component unit according to a first embodiment will now be described with reference to FIGS. 1 to 6.

Figure 1:
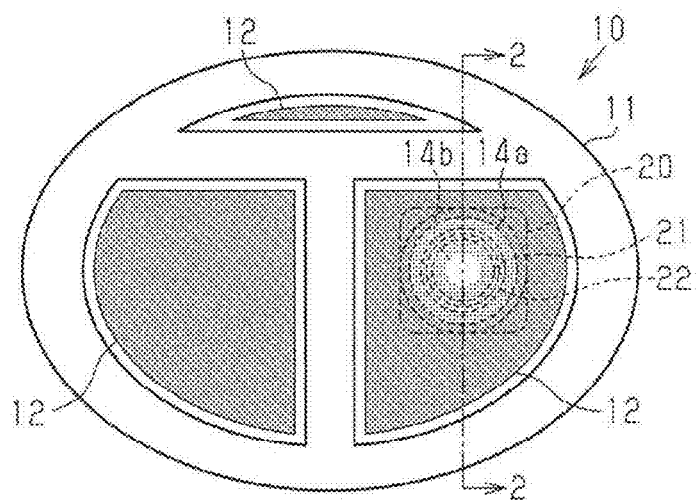
FIG. 1 is a front view of a decorative component with an in-vehicle camera according to a first embodiment, illustrating a positional relationship between the decorative component and the in-vehicle camera.

FIG. 1 shows a rear emblem 10 as a decorative component. The back door of a vehicle is an object for mounting a decorative component. For example, the rear emblem 10 is mounted on the back door of a vehicle in the center of the back door on the outside. A mark is one example of decoration in the rear emblem 10. The mark includes a shiny portion 11 with metallic luster and a background portion 12 without metallic luster. An in-vehicle camera 20 is arranged inside the back door on the back side of the rear emblem 10 while facing the rear emblem 10. An image of the area behind the vehicle is taken by the in-vehicle camera 20. In a front view, which is viewed from the front side of the rear emblem 10, the in-vehicle camera 20 is arranged in the background portion 12.

Figure 2:
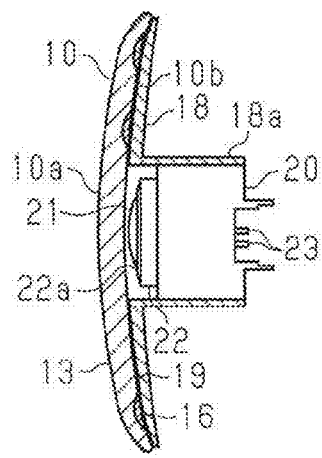
FIG. 2 is a cross-sectional view taken along line 2-2 of FIG. 1, illustrating the positional relationship between the decorative component and the in-vehicle camera.

As shown in FIG. 2, the rear emblem 10 is mounted on the back door via a fixing member 18. The rear emblem 10 adheres to the fixing member 18 with an adhesive agent 19. The portions of the rear emblem 10 and the fixing member 18 that adhere to each other with the adhesive agent 19 correspond to a light shield portion, which blocks entering light. The adhesive agent 19 may be replaced with an adhesive seal.

The fixing member 18 includes a tubular camera mounting portion 18a. The in-vehicle camera 20 is mounted to the camera mounting portion 18a of the fixing member 18 while a lens 21 of the in-vehicle camera 20 faces a back side 10b of the rear emblem 10. The in-vehicle camera 20 is provided with a tubular supporting portion 22, which surrounds the lens 21. The supporting portion 22 supports the periphery of the lens 21. A case of the lens 21, which includes the supporting portion 22, is preferably colored with black to reduce reflection light from the case, which enters the lens 21. To simplify the manufacturing process of the in-vehicle camera 20, at least a portion of the end face 22a of the supporting portion 22 may be colored with a color other than black, such as white. Connection terminals 23 are arranged on the back side of the in-vehicle camera 20 to output an image taken by the in-vehicle camera 20.

Figure 3:
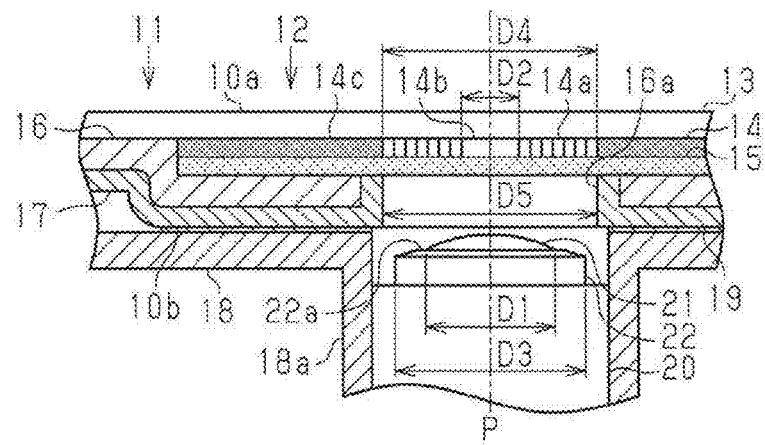
FIG. 3 is a partial cross-sectional view of the decorative component of FIG. 1.

As shown in FIG. 3, the rear emblem 10 includes a base member 13, which is made of a transparent plastic. The front side 10a of the rear emblem 10 is an outer surface exposed to the vehicle outside, and the outer surface is the front side of the base member 13. To take an image with the in-vehicle camera 20, the base member 13 is optically transparent and formed of, for example, acrylic resin. The base member 13 is colorless, but may be colored to suit to the design of the rear emblem 10.

A pattern print layer 14 is provided on a portion of the back side of the base member 13. The pattern print layer 14 separates an area that forms the background portion 12 from an area that forms a shiny portion 11. The pattern print layer 14 forms the background portion 12. The pattern print layer 14 includes an area occupied by a light transmission reducing portion 14a and an area without the light transmission reducing portion 14a. The light transmission reducing portion 14a reduces light reaching the vehicle inside after the base member 13 transmits the light. The area without the light transmission reducing portion 14a includes a light transmitting portion 14b. The light transmitting portion 14b is arranged to face the background portion 12, which is a portion without the shiny portion 11.

The light transmission reducing portion 14a is printed, for example, by screen printing on the back side of the base member 13. The pattern print layer 14, which is visible through the base member 13, is the background portion 12. The light transmission reducing portion 14a is located on the back side of the base member 13 while avoiding a portion facing the vicinity of the center P in the lens 21 of the in-vehicle camera 20. For example, the light transmission reducing portion 14a has a dot pattern, which is formed with a plurality of dot-like structures to reduce transmission of light. When a member is located on the vehicle interior side while facing the light transmission reducing portion 14a, it is hard to see the member from the vehicle outside due to the dot pattern.

The light transmitting portion 14b is an area without the pattern print layer 14 and without the light transmission reducing portion 14a on the back side of the transparent plastic base member 13. In other words, the light transmitting portion 14b is an area without dots. The light transmitting portion 14b is surrounded by the light transmission reducing portion 14a. The light transmission reducing portion 14a is formed around the light transmitting portion 14b. The light transmission reducing portion 14a has an optical transparency lower than that of the light transmitting portion 14b. The light transmission reducing portion 14a has a gradational dot pattern, in which the greater the distance from the light transmitting portion 14b, the greater the ratio of dots occupying unit area becomes. The light transmitting portion 14b faces the center P of the lens 21 of the in-vehicle camera 20 in the pattern print layer 14.

The light transmission reducing portion 14a and the light transmitting portion 14b are arranged in an area of the pattern print layer 14 in which the in-vehicle camera 20 is located on the back side. A non-light transmitting portion 14c is arranged in an area of the pattern print layer 14 in which the in-vehicle camera 20 is not located on the back side.

A smoke print layer 15 is arranged on the back side of the pattern print layer 14. The smoke print layer 15 is semi-transparent when viewed from the vehicle outside and is colored with a color, such as grey, with which it is hard to see the vehicle inside from the vehicle outside. The smoke print layer 15 covers the light transmission reducing portion 14a and the light transmitting portion 14b. The smoke print layer 15 is printed, for example, by screen printing. The smoke print layer 15 is printed with a color with which it is hard to see the vehicle inside over the smoke print layer 15 regardless of whether the smoke print layer 15 faces the lens 21 of the in-vehicle camera 20. Accordingly, when the side on which the back side 10b is located is viewed from the side on which the front side 10a of the rear emblem 10 is located, the inside is inconspicuous compared to that in a case in which the smoke print layer 15 is not colored and transparent.

Preferably, the color of the smoke print layer 15 and the color of the background portion 12 are the same type of color. In an area where the light transmission reducing portion 14a and the light transmitting portion 14b are located, the color of the smoke print layer 15 is visible from the vehicle outside. This area appears the same as an area where the color of the background portion 12 is visible from the vehicle outside. Thus, the light transmission reducing portion 14a and the light transmitting portion 14b are not noticeable. The pattern print layer 14 and the smoke print layer 15 correspond to a decorative layer (a first decorative layer) of the decorative component.

A second decorative layer 16 having metallic luster is formed on a part of the back side of the base member 13 excluding the pattern print layer 14 and on the back side of the smoke print layer 15. The pattern print layer 14 is separated from the second decorative layer 16 on the back side of the base member 13. The second decorative layer 16 is formed by vapor deposition on the base member 13, on which the smoke print layer 15 is arranged. Thus, the second decorative layer 16 is formed directly on a part of the back side of the base member 13 on which the smoke print layer 15 is not layered, that is, a part of the back side of the base member 13 excluding the pattern print layer 14. A through hole 16a is formed in the second decorative layer 16 in a portion of the pattern print layer 14 excluding the light transmission reducing portion 14a, that is, a portion corresponding to the light transmitting portion 14b. The through hole 16a extends through the second decorative layer 16. The second decorative layer 16 is visible from the vehicle outside through the base member 13 and forms the shiny portion 11.

A coated layer 17, on which protective coating is applied, is formed on the back side of the second decorative layer 16. The coated layer 17 reaches the inner wall surface of the through hole 16a in the second decorative layer 16. In the following, for convenience, to describe the structure of the decorative component, the second decorative layer 16 including the coated layer 17 is defined as the second decorative layer 16.

The in-vehicle camera 20 is mounted to the camera mounting portion 18a of the fixing member 18 with the lens 21 of the in-vehicle camera 20 facing the through hole 16a of the second decorative layer 16. The through hole 16a, which is formed in the second decorative layer 16, has an inside diameter D5, which is larger than the outside diameter D1 of the lens 21 and larger than the inside diameter D1 of the supporting portion 22.

A portion of the light transmission reducing portion 14a that surrounds the light transmitting portion 14b has an outside diameter D4, which is set larger than the outside diameter D3 of the supporting portion 22 in the in-vehicle camera 20. The outside diameter D2 of the light transmitting portion 14b is set smaller than the outside diameter D1 of the lens 21. In other words, the portion of the light transmission reducing portion 14a that surrounds the light transmitting portion 14b is located to include an area facing the inner circumferential edge of the supporting portion 22 of the in-vehicle camera 20, i.e., the supporting portion 22 that is mounted to the camera mounting portion 18a in the axial direction of the camera mounting portion 18a.

The portion of the light transmission reducing portion 14a that surrounds the light transmitting portion 14b has an outside diameter D4, which is set to be the same as the inside diameter D5 of the through hole 16a in the second decorative layer 16. In other words, the portion of the light transmission reducing portion 14a that surrounds the light transmitting portion 14b has an inner edge that faces the opening edge of the through hole 16a in the second decorative layer 16.

Figure 4:
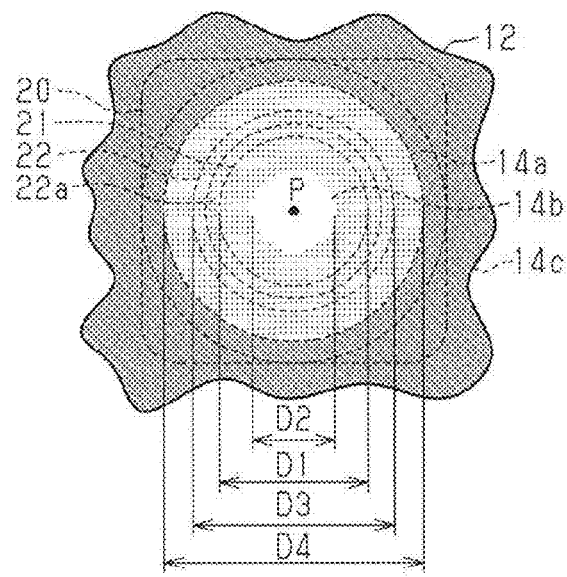
FIG. 4 is a diagram illustrating the positional relationship between the decorative component and the in-vehicle camera of FIG. 1.

As shown in FIG. 4, the lens 21 of the in-vehicle camera 20 has a circular outer shape. The outer shape of the light transmission reducing portion 14a and the outer shape of the light transmitting portion 14b are circular to fit to the outer diameter of the lens 21 in the in-vehicle camera 20.

When viewed from the side on which the front side 10a of the rear emblem 10 is located, the vicinity of the center P of the lens 21 in the in-vehicle camera 20 is included in the light transmitting portion 14b of the pattern print layer 14. The supporting portion 22 of the in-vehicle camera 20 is included in the light transmission reducing portion 14a of the pattern print layer 14.

Figure 5:
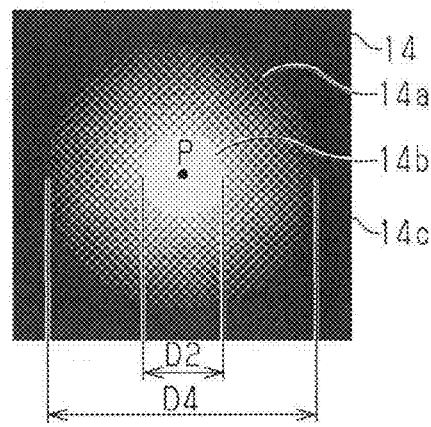
FIG. 5 is a diagram showing a pattern print layer applied to the decorative component of FIG. 1.
Figure 6:
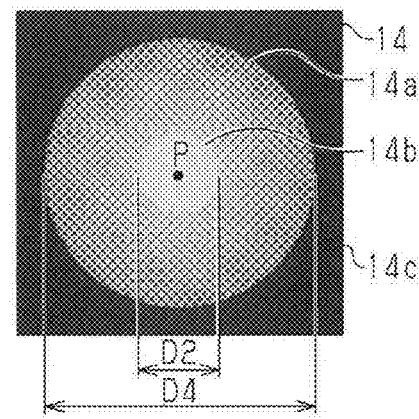
FIG. 6 is a diagram showing a pattern print layer applied to the decorative component of FIG. 1.

As shown in FIGS. 5 and 6, the pattern made by the light transmission reducing portion 14a is a dot pattern, in which dot-like structures are arranged. The dot pattern reduces transmission of light. The dot pattern of the light transmission reducing portion 14a has a gradation such that the greater the distance from an area facing the vicinity of the center P of the lens 21 in the in-vehicle camera 20, the greater the ratio of dots occupying unit area becomes. In the dot pattern of the light transmission reducing portion 14a, the sizes of dots may be selectable according to the purpose, such as the angle of view and the amount of light required for the in-vehicle camera 20, and the gradation may be omitted.

The dot pattern shown in FIG. 5 has a gradation in which the sizes of dots intermittently increase by 10% to 90% relative to a reference size, as the distance from the center of the light transmitting portion 14b increases. In this way, the portion of the light transmission reducing portion 14a that surrounds the light transmitting portion 14b has an inconspicuous inner edge. Thus, the border between the light transmission reducing portion 14a and the light transmitting portion 14b is not noticeable.

The dot pattern shown in FIG. 6 has a gradation in which the sizes of dots intermittently increase by 10% to 33% relative to a reference size, as the distance from the center of the light transmitting portion 14b increases. In this way, the dots surrounding the light transmitting portion 14b have a smaller size than the dot pattern shown in FIG. 5. This reduces the area that intervenes in a taken image.

Operation of the rear emblem 10 configured as above will now be described.

As shown in FIG. 1 and FIG. 4, when the rear emblem 10 is viewed from the vehicle outside, a portion of the background portion 12 is the light transmission reducing portion 14a. Thus, the light transmitting portion 14b surrounded by the light transmission reducing portion 14a appears to be substantially assimilated into the light transmission reducing portion 14a. In particular, the dot pattern of a gradation part becomes dark from the inner side to the outer side. Thus, the presence of the light transmitting portion 14b is not noticeable. The in-vehicle camera 20, which is located on the back side 10b of the rear emblem 10, blends into the dot pattern of the light transmission reducing portion 14a. Thus, the presence of the in-vehicle camera 20 is not noticeable from the vehicle outside. As shown in FIG. 3, the light transmission reducing portion 14a and the light transmitting portion 14b appear light colored in the background portion 12. However, when the in-vehicle camera 20 is mounted, light does not enter from the back side 10b of the rear emblem 10, and the difference is almost invisible in the background portion 12.

The in-vehicle camera 20 is located on the back side 10b of the rear emblem 10. When an image of the area behind the vehicle is taken by the in-vehicle camera 20, the in-vehicle camera 20 receives light through a light path formed by the light transmitting portion 14b and the through hole 16a. To take an image of a necessary area behind the vehicle, the in-vehicle camera 20 is focused on the area. Even if a portion of the gradation part is located within the angle of view in the in-vehicle camera 20, dots that overlap with the imaging area are blurred in the image. Thus, the driver can check the area behind the vehicle. The reflection of light toward the in-vehicle camera 20 is less likely to occur than a decorative component formed by a one-way mirror. This increases the amount of light for the in-vehicle camera 20, and a vivid image can be taken by the in-vehicle camera 20.

The in-vehicle camera 20 is located inside the back door, that is, on the back side 10b of the rear emblem 10. This limits the worsening of the vehicle appearance that would be caused by exposing the in-vehicle camera 20. Since the lens 21 of the in-vehicle camera 20 is not exposed, the lens 21 is not contaminated with mud and dust.

As described above, the present embodiment achieves the following advantages.

(1) The in-vehicle camera 20 is mounted on the back side 10b of the rear emblem 10. The in-vehicle camera 20 receives light through the light transmitting portion 14b of the pattern print layer 14. Thus, it is possible to take an image of an area outside the vehicle without interruption of the light transmission reducing portion 14a in the second decorative layer 16. In addition, when the rear emblem 10 is viewed from the vehicle outside, the in-vehicle camera 20 is inconspicuous due to the light transmission reducing portion 14a.

(2) The light transmission reducing portion 14a is easily formed by printing a dot pattern. The extent of reduction in light transmission is easily adjusted by changing the ratio of the area occupied by dots in a unit area in the light transmission reducing portion 14a.

(3) In the pattern of the light transmission reducing portion 14a, the ratio of dots increases as the distance from the light transmitting portion 14b increases. Thus, the extent of reduction in light transmission is set greater as the distance from the light transmitting portion 14b increases in the light transmission reducing portion 14a. Thus, the border between the light transmitting portion 14b and the light transmission reducing portion 14a becomes inconspicuous. Accordingly, when the in-vehicle camera 20 is viewed from the vehicle outside, the visibility is further limited.

(4) In addition to the pattern print layer 14, which has the light transmitting portion 14b and the light transmission reducing portion 14a, the smoke print layer 15 is provided. Thus, the presence of the in-vehicle camera 20 is less noticeable from the vehicle outside.

(5) In the axial direction of the camera mounting portion 18a, the light transmission reducing portion 14a is arranged at a position facing the inner circumferential edge of the camera mounting portion 18a, on which the supporting portion 22 is mounted. Thus, it is hard to see the supporting portion 22 of the in-vehicle camera 20 from the vehicle outside.

(6) The camera mounting portion 18a is mounted on the rear emblem 10. This saves the trouble of adjusting the positional relationship between the rear emblem 10 and the camera mounting portion 18a, that is, positioning the light transmitting portion 14b, the light transmission reducing portion 14a, and the in-vehicle camera 20.

(7) The light transmission reducing portion 14a is printed inside a portion of the second decorative layer 16 that faces the through hole 16a. Thus, it is harder to see the in-vehicle camera 20 from the vehicle outside.

(8) The second decorative layer 16 having metallic luster covers the non-light transmitting portion 14c of the pattern print layer 14 (the background portion 12). Thus, light is further blocked by the non-light transmitting portion 14c. Accordingly, light entering the camera mounting portion 18a is blocked.

Second Embodiment

A decorative component and a decorative component unit according to a second embodiment will now be described with reference to FIGS. 7 and 8. The decorative component according to the present embodiment is different from that of the first embodiment in that a decorative member 31 is mounted instead of the second decorative layer 16 on the front side of the base member 13, which is made of transparent plastic, and that the decorative member 31 is mounted on a recess 30 formed in the base member 13. In the following, the differences from the first embodiment will mainly be described.

Figure 7:
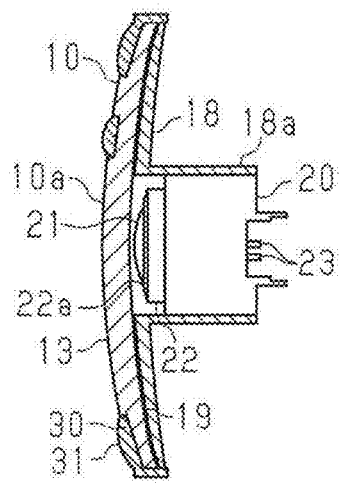
FIG. 7 is a cross-sectional view of a decorative component according to a second embodiment.

As shown in FIG. 7, the rear emblem 10 includes the base member 13. The front side 10a of the rear emblem 10 is an outer surface, which is exposed to the vehicle outside. At least a portion of the outer surface is the front side of the base member 13. The base member 13 is made, for example, of acrylate resin so that transmitted light enables the in-vehicle camera 20 to record an image.

Figure 8:
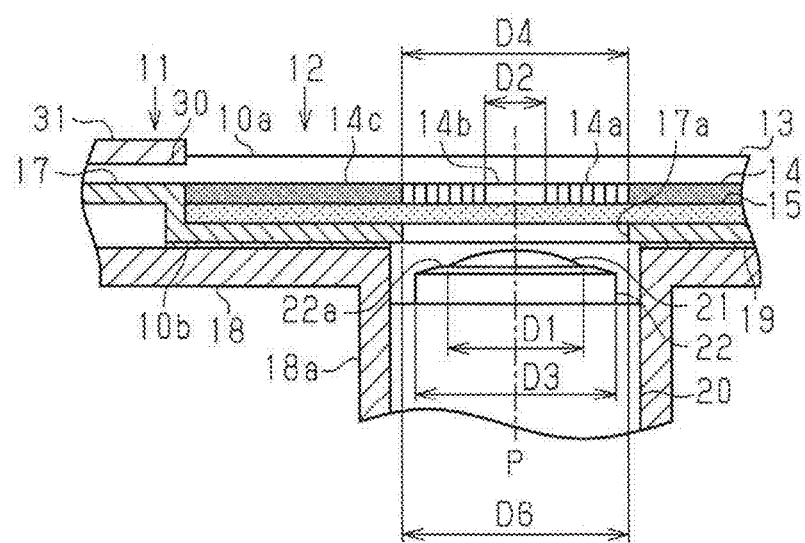
FIG. 8 is a partial cross-sectional view of the decorative component of FIG. 7.

As shown in FIG. 8, the pattern print layer 14 and the smoke print layer 15 are arranged on a portion of the back side of the base member 13 in a similar way to the first embodiment. The second decorative layer 16 is not formed on the back side of the base member 13. Thus, the coated layer 17, to which protective coating is applied, is arranged on the back side of the smoke print layer 15. The through hole 17a is formed in the coated layer 17.

The in-vehicle camera 20 is mounted on the camera mounting portion 18a of the fixing member 18 with the lens 21 of the in-vehicle camera 20 facing the through hole 17a of the coated layer 17. The through hole 17a, which is formed in the coated layer 17, has an inside diameter D6, which is set larger than the outside diameter D1 of the lens 21 and larger than the inside diameter D1 of the supporting portion 22. The portion of the light transmission reducing portion 14a that surrounds the light transmitting portion 14b has an outside diameter D4, which is set to be the same as the inside diameter D6 of the through hole 17a in the coated layer 17.

As shown in FIG. 7, the decorative member 31, which corresponds to the shiny portion 11 having metallic luster in the rear emblem 10, is mounted on the front side of the base member 13. The decorative member 31 is formed in three dimensions and made of, for example, an ABS plastic. A plating process is applied to the front side of the decorative member 31, for example, with hexavalent chromium. The recess 30 is formed on the front side of the base member 13 to mount the decorative member 31. The light transmitting portion 14b is arranged at a position facing the background portion 12, in which the decorative member 31 does not exist.

When the decorative member 31 is mounted on the base member 13, the decorative member 31 appears to rise from the base member 13 so that the rear emblem 10 becomes three-dimensional. A portion of the base member 13 in which the light transmitting portion 14b is formed preferably has a constant thickness, so that an image taken by the in-vehicle camera 20 is not likely to be distorted due to the thickness of the portion of the base member 13 that transmits light.

In the rear emblem 10 configured as above, a part of the background portion 12 is the light transmission reducing portion 14a when the rear emblem 10 is viewed from the vehicle outside in a similar way to the first embodiment. Thus, the light transmitting portion 14b, which is surrounded by the light transmission reducing portion 14a, appears to be substantially assimilated into the light transmission reducing portion 14a.

As described above, the second embodiment achieves the following advantage in addition to the advantages (1) to (6).

(9) The decorative member 31 is provided on the front side of the base member 13. Thus, the decorative member 31 with metallic luster and the protruding shiny portion 11 give the rear emblem 10 a three dimensional appearance.

The above-illustrated embodiments may be carried out in the following forms.

In the above-illustrated embodiments, the rear emblem 10 adheres to the fixing member 18 with the adhesive agent 19. However, the rear emblem 10 and the fixing member 18 may be welded by laser or the like.

In the above-illustrated embodiments, the base member 13 is made of acrylate resin. However, the material is not limited to the acrylate resin. The base member 13 may be made of another transparent plastic such as polycarbonate resin.

In the above-illustrated embodiments, the light transmission reducing portion 14a and the smoke print layer 15 are formed by screen printing. However, the way of printing is not limited to screen printing. The light transmission reducing portion 14a and the smoke print layer 15 may be formed by another printing technique such as hot stamping.

In the above-illustrated first embodiment, the smoke print layer 15 is arranged between the light transmission reducing portion 14a and the second decorative layer 16. However, the smoke print layer 15 may be omitted, for example, if the light transmitting portion 14b is sized to be inconspicuous, and it is hard to see the in-vehicle camera 20 without the smoke print layer 15 when viewed from the vehicle outside. In this case, the second decorative layer 16 is arranged directly on the back side of the light transmission reducing portion 14a.

In the first embodiment, the light transmission reducing portion 14a is arranged to close a part of the opening in the through hole 16a formed in the second decorative layer 16. Instead of this, the light transmission reducing portion 14a may be printed outside a portion of the second decorative layer 16 that faces the through hole 16a, for example, if the light transmitting portion 14b is sized to be inconspicuous, and it is hard to see the in-vehicle camera 20 when viewed from the vehicle outside. In other words, the portion of the light transmission reducing portion 14a that surrounds the light transmitting portion 14b may have an outside diameter D4 set larger than the inside diameter D5 of the through hole 16a of the second decorative layer 16.

In the above-illustrated embodiments, the light transmission reducing portion 14a is arranged in a portion that faces the supporting portion 22 of the in-vehicle camera 20, i.e., at a position that faces the inner circumferential edge of the camera mounting portion 18a, on which the supporting portion 22 is mounted. Instead of this, the light transmission reducing portion 14a may be arranged outside the inner circumferential edge of the camera mounting portion 18a in a configuration in which it is hard to see the supporting portion 22 of the in-vehicle camera 20 from the vehicle outside. For example, such a configuration is that the color of the background portion 12 is matched with the color of the supporting portion 22 in the in-vehicle camera 20.

In the above-illustrated first embodiment, a portion of the light transmission reducing portion 14a that surrounds the light transmitting portion 14b has an outside diameter D4, which is set to be the same as the inside diameter D5 of the through hole 16a in the second decorative layer 16. Instead of this, the portion of the light transmission reducing portion 14a that surrounds the light transmitting portion 14b may have an outside diameter D4, which is set, for example, smaller than the inside diameter D5 of the through hole 16a in the second decorative layer 16 as long as the non-light transmitting portion 14c is not located within the angle of view of the in-vehicle camera 20.

In the first embodiment, the pattern print layer 14, the smoke print layer 15, and the second decorative layer 16 are arranged on the back side of the base member 13. However, the pattern print layer 14, the smoke print layer 15, and the second decorative layer 16 may be arranged on the front side of the base member 13. In this case, the second decorative layer 16 is arranged on the front side of the base member 13. The smoke print layer 15 is arranged on the front side of the second decorative layer 16. The pattern print layer 14 is arranged on the front side of the smoke print layer 15. The positions of the pattern print layer 14 and the smoke print layer 15 may be reversed. Preferably, the coated layer 17 is arranged at the outermost position.

In the configuration according to the first embodiment, the second decorative layer 16 may be omitted, so that the pattern print layer 14 and the smoke print layer 15 form a mark, which is one example of decoration.

Figure 9:
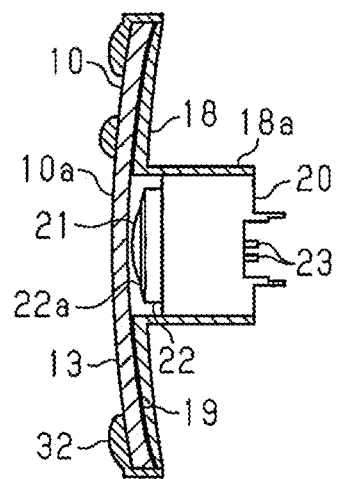
FIG. 9 is a cross-sectional view of a decorative component in a modification.

In the second embodiment, the recess 30 is formed in the base member 13. However, the base member 13 may be formed to be flat, and a decorative member may be placed on the front side of the flat base member 13 to form a rear emblem. For example, as shown in FIG. 9, using the base member 13 with the flat front side, the pattern print layer 14 and the smoke print layer 15 are arranged on the back side of the base member 13. The decorative member 32 with metallic luster is arranged on the front side of the base member 13. In this way, the shape of the base member 13 becomes substantially plate-like so that the shaping process becomes easier. In addition, the rear emblem 10 can have a three dimensional appearance with the decorative member 32 having metallic luster and the protruding shiny portion 11.

In the second embodiment, the pattern print layer 14 and the smoke print layer 15 are arranged on the back side of the base member 13. However, the pattern print layer 14 and the smoke print layer 15 may be arranged on the front side of the base member 13. In this case, the smoke print layer 15 is arranged on the front side of the base member 13, and the pattern print layer 14 is arranged on the front side of the smoke print layer 15. The positions of the pattern print layer 14 and the smoke print layer 15 may be reversed.

In the second embodiment, the portion of the light transmission reducing portion 14a that surrounds the light transmitting portion 14b has an outside diameter D4, which is set to be the same as the inside diameter D6 of the through hole 17a in the coated layer 17. Instead of this, for example, the portion of the light transmission reducing portion 14a that surrounds the light transmitting portion 14b may have an outside diameter D4 that is set smaller than the inside diameter D6 of the through hole 17a in the coated layer 17 as long as the non-light transmitting portion 14c is not located within the angle of view of the in-vehicle camera 20.

In the configuration according to the second embodiment, the decorative member 31 may be omitted, and the pattern print layer 14 and the smoke print layer 15 form a mark, which is one example of decoration.

The above-illustrated embodiments use a dot pattern with a gradation part in which dots intermittently change in size relative to a reference size. However, another dot pattern may be used in which the same sized dots are arranged while changing the density (occupancy rate) in a gradation part.

In the above-illustrated embodiments, the light transmission reducing portion 14a of the pattern print layer 14 has a dot pattern. However, not limited to the dot pattern, the pattern may be a stripe pattern, in which parallel lines are arranged in one direction, or a lattice pattern, in which lines are arranged to intersect with each other. These patterns may be used as long as the pattern causes the in-vehicle camera 20 to be inconspicuous when the in-vehicle camera 20 is viewed from the vehicle outside.

Figure 10:
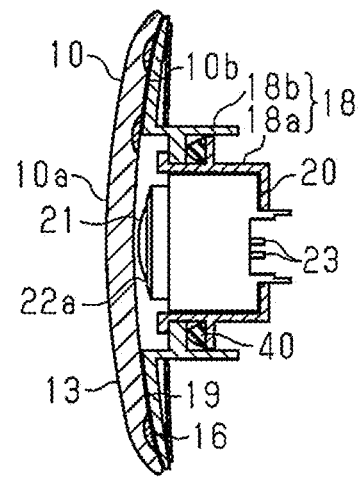
FIG. 10 is a cross-sectional view illustrating the mounting structure of the decorative component of FIG. 9 with a camera mounting portion.

In the above-illustrated embodiments, the fixing member 18 may include an emblem mounting portion 18b that is formed separately from the camera mounting portion 18a as shown in FIG. 10. An annular seal 40 may be placed between the camera mounting portion 18a and the emblem mounting portion 18b of the fixing member 18. When the emblem mounting portion 18b is mounted on the camera mounting portion 18a, the seal 40 is pressed so that the portion between the camera mounting portion 18a and the emblem mounting portion 18b is sealed. This prevents water from entering the in-vehicle camera 20 from the fixing member 18.

In addition, the seal 40 may have a light absorption property and light shielding property so that light is prevented from entering the interior of the camera mounting portion 18a through a gap between the camera mounting portion 18a and the emblem mounting portion 18b.

In the above-illustrated embodiments, the base member 13 is formed of transparent plastic. However, the material is not limited to plastic. Another transparent material such as glass may be used.

In the above-illustrated embodiments, the decorative component unit is formed with the rear emblem 10 and the fixing member 18. However, the decorative component may be formed only with the rear emblem 10. In addition, the decorative component and the decorative component unit may be applied to a front emblem, which is mounted on the front of the vehicle. In addition, the decorative component is not limited to an emblem. The decorative component and the decorative component unit may be applied to any component that includes a decorative layer with a light transmitting portion and a light transmission reducing portion. For example, the present invention may be applied to a garnish, a spoiler, a component with a high mount stop lamp, a bumper, and the like.

The invention claimed is:

1. A decorative component adapted to be mounted on a vehicle and have an outer surface, which is exposed to the vehicle outside, wherein an in-vehicle camera is arranged in the vehicle while facing the outer surface, and the decorative component transmits light toward the in-vehicle camera from the vehicle outside, the decorative component comprising:
    a transparent base member, which forms at least a part of the outer surface; and
    a decorative layer arranged on a part of one of a front side and a back side of the base member, wherein
    the decorative layer includes:
        a light transmitting portion; and
        a light transmission reducing portion that is arranged around the light transmitting portion and transmits less light than the light transmitting portion,
    wherein the light transmission reducing portion is a printed dot pattern in which a plurality of dots is arranged.

2. The decorative component according to claim 1, wherein the dot pattern is set such that the greater the distance from the light transmitting portion, the greater the ratio of dots occupying a unit area becomes.

3. The decorative component according to claim 1, wherein the decorative layer includes:
    a pattern print layer having the light transmitting portion and the light transmission reducing portion; and
    a smoke print layer, which is semitransparent when viewed from the outer surface.

4. The decorative component according to claim 1, wherein:
    the decorative layer is a first decorative layer,
    the first decorative layer is arranged on a back side of the base member,
    a second decorative layer with metallic luster is partially arranged on a back side of the first decorative layer, and
    the light transmitting portion is arranged at a position facing a portion free of the second decorative layer.

5. The decorative component according to claim 1, wherein
    the decorative member having metallic luster is partially arranged on a front side of the base member, and
    the light transmitting portion is arranged at a position facing a portion free of the decorative member.

6. A decorative component unit adapted to be mounted on a vehicle, the decorative component unit comprising:
    a decorative component, which is adapted to be mounted on a vehicle, has an outer surface exposed to a vehicle outside, and is adapted to transmit light from the vehicle outside toward an in-vehicle camera arranged in the vehicle while facing the outer surface; and
    a tubular camera mounting portion coupled to the decorative component, wherein the in-vehicle camera is mounted on the camera mounting portion,
    the decorative component includes:
        a transparent base member, which forms at least a part of the outer surface; and
        a decorative layer arranged on a part of one of a front side and a back side of the base member, and
    the decorative layer including:
        a light transmitting portion; and
        a light transmission reducing portion that is arranged around the light transmitting portion and transmits less light than the light transmitting portion,
    wherein the decorative layer includes:
        a pattern print layer having the light transmitting portion and the light transmission reducing portion; and
        a smoke print layer which is semitransparent when viewed from the outer surface.

7. The decorative component unit according to claim 4, wherein the light transmission reducing portion is arranged at a position facing an inner circumferential edge of the camera mounting portion in an axial direction of the camera mounting portion.

8. The decorative component unit according to claim 4, wherein a light shield portion is arranged between the decorative component and the camera mounting portion over the entire circumference, and the light shield portion blocks light entering an interior of the camera mounting portion.

9. A decorative component unit adapted to be mounted on a vehicle, the decorative component unit comprising:
    a decorative component, which is adapted to be mounted on a vehicle, has an outer surface exposed to a vehicle outside, and is adapted to transmit light from the vehicle outside toward an in-vehicle camera arranged in the vehicle while facing the outer surface; and
    a tubular camera mounting portion coupled to the decorative component, wherein the in-vehicle camera is mounted on the camera mounting portion,
    the decorative component includes:
        a transparent base member which forms at least a part of the outer surface; and
        a decorative layer arranged on a part of one of a front side and a back side of the base member, and the decorative layer including:
  a light transmitting portion; and
  a light transmission reducing portion that is arranged around the light transmitting portion and transmits less light than the light transmitting portion,
wherein the light transmission reducing portion includes one of a striped pattern of parallel lines extending in one direction and a lattice pattern of two sets of parallel lines arranged to intersect each other.

* * * * *